United States Patent [19]
Jordan

[11] Patent Number: 5,133,217
[45] Date of Patent: Jul. 28, 1992

[54] TENSIOMETER

[76] Inventor: Donald J. Jordan, 113 Evergreen La., Glastonbury, Conn. 06033

[21] Appl. No.: 614,149

[22] Filed: Nov. 15, 1990

[51] Int. Cl.⁵ .................................................. G01L 5/04
[52] U.S. Cl. .................................................. 73/862.47
[58] Field of Search ............ 73/862.45, 862.47, 862.48

[56] References Cited

U.S. PATENT DOCUMENTS 2,592,868  4/1952  Cushman ........................... 73/862.47
3,174,334  3/1965  McKernan ........................ 73/862.47

Primary Examiner—Reinhard J. Eisenzopf
Assistant Examiner—Elizabeth Shopbell
Attorney, Agent, or Firm—Chilton, Alix & Van Kirk

[57] ABSTRACT

A tensiometer for measuring the tension of a racquet string employs a spring biased plunger which is articulated to a pivoted indicator arm. The racquet string being tested is supported on spaced legs and engaged by the plunger. The tension is indicated on a scale by the angular position of the indicator arm.

19 Claims, 1 Drawing Sheet

TENSIOMETER

BACKGROUND OF THE INVENTION (1) Field of the Invention

This invention relates generally to the measurement of the tension in elongated flexible material such as string, cord, wire, cable and the like. More particularly, the present invention is directed to compact devices for measuring the tension of the strings of a sports racquet. Accordingly, the general objects of the present invention are to provide novel and improved methods and apparatus of such character.

(2) Description of the Prior Art

While not limited thereto in its utility, the present invention is particularly well suited for use in measuring the tension in the strings of a tennis racquet. A number of compact devices have been proposed for measuring the tension of the strings of a tennis racquet or other sport racquet. For example, Walker U.S. Pat. No. 4,309,910 discloses a racquet string tension tester which employs an elongated hollow handle having a cylindrical block rotatably mounted in a circular opening at the front of the handle. A torsion spring mounted within the handle extends between the cylindrical block and the rear of the handle. V-shaped notches are disposed at the outer end of the cylindrical block for firmly engaging the strings to be tested. The handle is manually rotated for sensing the tension of the strings of a racquet.

Cummins et al U.S. Pat. No. 3,831,442 discloses a string tension measuring device having an integral form which includes a handle, a string engaging portion and a resilient portion which joins the handle and the string engaging portion. The string engaging portion has a calibrated scale and a reference mark. The handle has an index mark which is positioned so that when the handle is twisted relative to the engaged portion of the string, the tension is indicated on the scale by the index mark when the reference mark aligns with the string being tested.

The devices disclosed in the above-discussed patents operate on substantially the same principle. A torque is applied to a string to cause deflection thereof in the plane of the racquet. The amount of deflection corresponds to the tension of the string. Because the racquet and strings are deflected in the plane of the racquet, the deflected string necessarily slides across the adjacent cross-strings. The sliding across other strings during displacement of the string under test introduces a significant friction force which effects the measurement and thus limits the accuracy of the measurement. In addition, there is necessarily friction between the moving parts of the prior devices and such friction can be a significant source of error in the tension measurement. Moreover, in the devices disclosed in U.S. Pat. Nos. 3,831,442 and 4,309,910, the tension is measured by manual application of a torque. Consequently, the quality of the measurement is also a function of the skill of the tester.

SUMMARY OF THE INVENTION

Briefly stated, the invention in a preferred form is a method and device for measuring the tension of a racquet string or the like. The device comprises a frame and a pair of laterally spaced string supports extending from the frame. An indicator arm is pivotally mounted to the frame. A plunger is pivotally mounted to the indicator arm and is displaceable between the string supports. A spring is mounted to the frame and engages the plunger. A scale mounted in fixed relationship to the frame indicates the tension of the string by its relationship to the terminus of the indicator arm. The string to be tested is received in the string supports. The plunger, under the bias of the spring, engages the string between the supports and deflects the string in a direction which is generally normal to the plane of the racquet. The position of the plunger determines the angle of the pivot arm to thereby indicate the tension of the string. The string supports may be formed by notches in flexible support legs. The biasing spring is disposed so as to surround the support legs. The spring/plunger structure is configured so that the plunger is displaceable relative to the frame with minimal loss due to friction between components of the measuring device.

An object of the invention is to provide a new and improved tensiometer having an efficient, compact and inexpensive construction.

Another object of the invention is to provide a new and improved technique for measuring the tension of a racquet string having tensions in the range of 30 to 100 pounds.

Another object of the invention is to provide a new and improved tensiometer which is capable of measuring relatively small tension values with a high degree of accuracy.

A further object of the invention is to provide a new and improved tensiometer which can be mass produced with a relatively consistent calibration.

Other objects and advantages of the invention will become apparent from the drawings and the specification.

DETAILED DESCRIPTION OF THE PREFERRED EMBODIMENT

Figure 1:
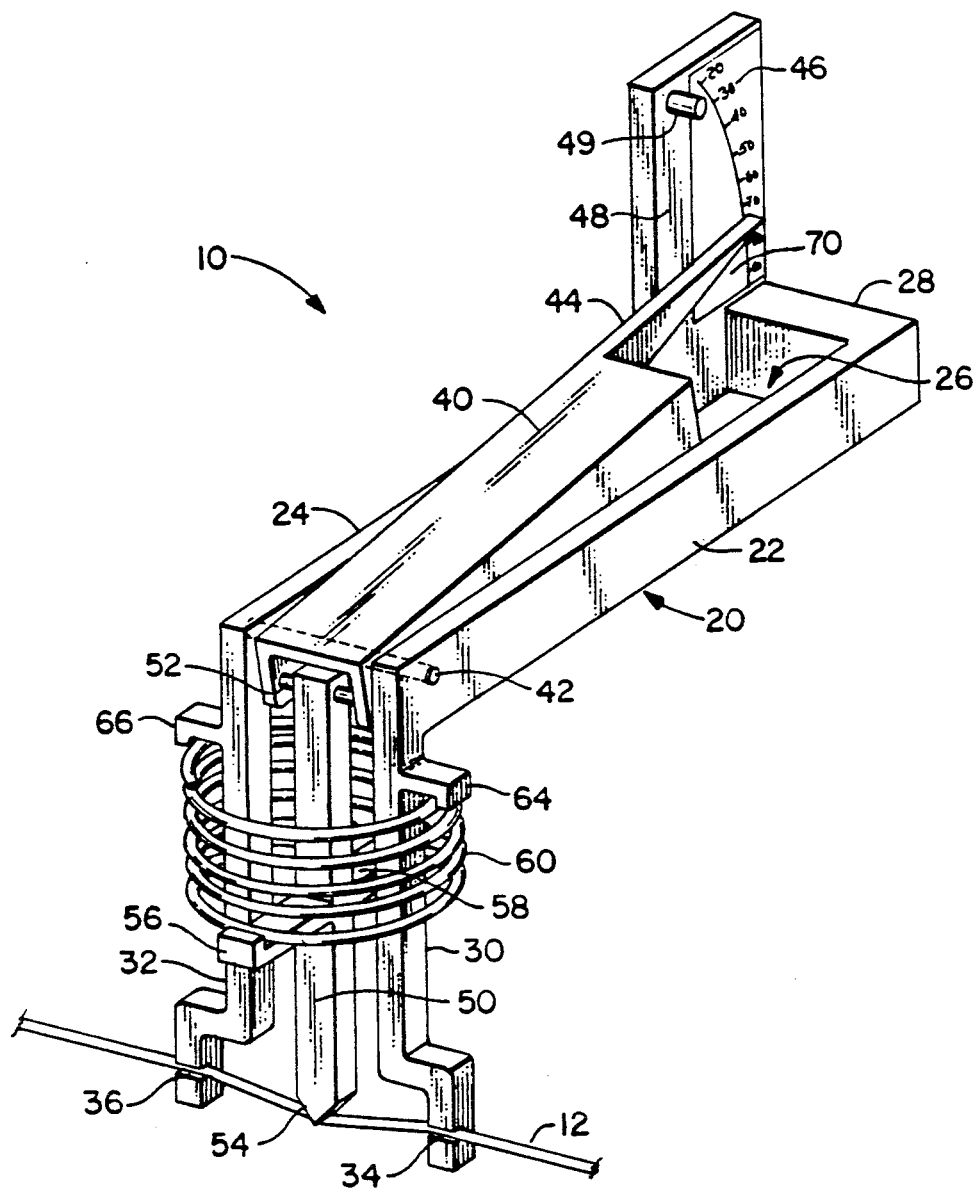
FIG. 1 is a perspective view of a tensiometer in accordance with the present invention, said tensiometer being illustrated in connection with a racquet string for which the tension is being measured.

With reference to the the drawings, wherein like numerals represent like parts throughout the figures, a tensiometer for measuring tension in a string in accordance with the present invention is generally designated by the numeral 10. Tensiometer 10 is particularly well suited for measuring the tension of elongated flexible articles such as cord, wire or cable and the like and has particular application for measuring the string tension of sports racquet strings. The tensiometer is illustrated in conjunction with a racquet string 12.

The tensiometer 10 comprises a frame 20 having a pair of substantially parallel side beams 22 and 24 which define a slot 26. An integral cross brace 28 at the rear connects the side beams. Laterally spaced support legs 30 and 32 integrally extend perpendicularly from, and in the disclosed embodiment are integral with, a lower front portion of respective of the side beams. The support legs 30 and 32 are essentially mirror images and include a compound bend adjacent their lower terminus so that the support legs are generally parallel but are laterally spaced a greater distance at the lower terminal portions than at the intermediate and upper portions thereof. The frame including the support legs may be constructed from a molded plastic material such as Lexan. The ratio of the length to the cross-section dimensions of the support legs 30 and 32 is sufficiently great to permit limited flexure of the support legs as detailed below.

Substantially identical generally V-shaped notches 34 and 36 are formed respectively at the frontal lower portions of the support legs 30 and 32. The notches are dimensioned for receiving longitudinally spaced portions of the racquet string 12.

An indicator arm 40 is pivotally mounted adjacent its first end at an upper forward portion of the frame side beams by means of a pivot pin 42. The indicator arm 40 is at least partially received in slot 26. The terminus or second end of the indicator arm tapers to form a pointer 44. The pointer 44 is positioned adjacent and movable relative to a scale 46 which is fixed to an upper support panel 48 which projects from the side beam 24. The indicator arm, and in particular the pointer 44, is dimensioned so that the pivotal movement of the arm is angularly limited by downward engagement by the pointer against the cross beam 28 and upward engagement of the pointer against the underside of a stud 49 which projects from panel 48.

The indicator arm 40 is at least partly in the form of a channel. The first or upper end of a plunger 50 is received in the channel defined by arm 40 as shown. Plunger 50 is pivotally mounted to arm 40 by means of a pivot pin 52. The pivot axis defined by pin 52 is offset from the pivot axis defined by pin 42. The plunger 50 terminates at its lower or second end in a wedge 54. The wedge 54 is configured and adapted for engaging a racquet string 12 disposed in the notches 34, 36 at a medial lateral position between the legs 30 and 32.

A pair of opposed truncated L-shaped retainer members 56 and 58 respectively project forwardly and rearwardly from plunger 50. The members 56 and 58 function to seat a lower end of a helical coil spring 60. The coil spring 60 surrounds the support legs 30 and 32 and is retained to the frame by a pair of laterally projecting studs 64 and 66 of inverted truncated L-shaped form which extend from the support legs 30 and 32. The spring 60 thus biases the plunger (downwardly in FIG. 1) relative to the frame 20. Displacement of the plunger 50 results in a corresponding angular displacement of the pointer end 44 of indicator arm 40. If the wedge 54 is not in engagement with the string 12, the displacement of the plunger is normally limited or checked by the engagement of the indicator pointer 44 against the stop 49. The spring 60 imposes a substantially constant bias force on the plunger 50. For a tensiometer which would be constructed to measure tension in the range to 30 to 80 pounds, a suitable coil spring would have a spring force of approximately 24 pounds.

In the disclosed embodiment, the tension of the racket string 12 is measured by manually forcing the indicator arm downwardly so that that the plunger is forced upwardly against the bias of the spring 60 to a retracted position. The tensiometer is then positioned on the racquet string wherein longitudinally spaced portions of the string are received in the notches 34 and 36 of the support legs. The indicator arm 40 is then released. The substantially constant bias force of the coil spring 60 forces the plunger wedge 54 into engagement with the string at a medial point between the notches 34 and 36 to deflect the string downwardly in a direction which is generally normal to the plane P of the racquet face. The displacement of the plunger is proportional to the tension in the racquet string. The degree of rotation of the indicator arm about its pivot pin 42 will therefore be proportional to the tension in the string 12. By proper calibration of scale 46, accordingly, the angular alignment of the indicator needle 44 with the indicia of scale 46 will indicate the tension in the string.

In a preferred embodiment, a numerical indicia scale is printed on an adhesive tape and installed on panel 48 in a final production step. Prior to the scale installation step, each tensiometer is placed on an accurately tensioned racquet string, such as, for example, a string tensioned to 50 pounds. The reference position of the indicator pointer 44 is then marked. The scale tape 70 may then be affixed to the panel 48 so that the 50 pound scale mark, for example, coincides with the reference mark. The remaining graduations on the tension scale have been predetermined by empirical means. Consequently, the scale may be relatively easily calibrated to provide an accurate tension measurement even though the construction of the tensiometer 10 may be relatively inexpensive.

Figure 2:
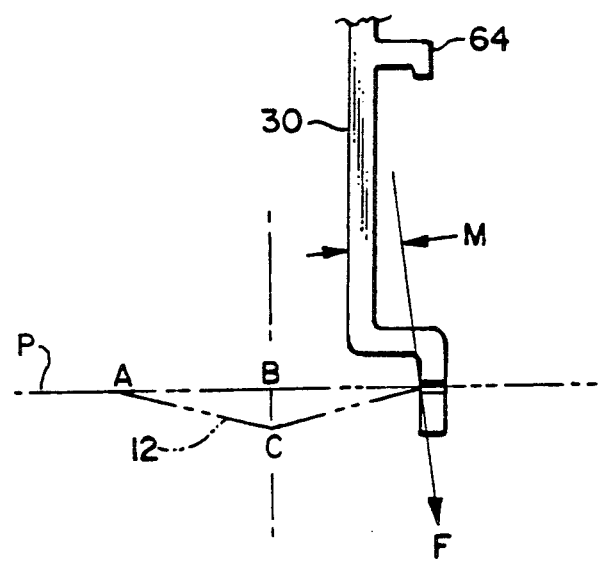
FIG. 2 is a fragmentary front view, partly in schematic, illustrating the operation of the tensiometer of FIG. 1.

A feature of tensiometer 10 is the spacial orientation of the deflected portion of the racquet string during measurement of the string tension. As best illustrated in FIG. 2, the plunger wedge forces the racquet string in a direction which is generally normal to the plane P of the racquet developed tension force. Unlike prior measuring techniques, during practice of the present invention, the string being tested will not slide over adjacent cross-strings and, therefore, indeterminate friction forces will not degrade the accuracy of the measurement. In addition, as the string is deflected, distance AC becomes greater than distance AB and this results in the racquet string tending to slide along the string support notches 34 and 36 at, for example, point A. Any such sliding movement will cause friction and may potentially impair the accuracy of the tensiometer. By constructing the string support legs from a plastic material which is semi-flexible, and also by shaping the engagement portions of the support legs, the string under its tension force tends to bend the support legs inwardly at point A. As illustrated in FIG. 2 the resultant force F from the string passes outside of the string support by a distance M, thus creating a moment which tends to bend the string support leg 30 inwardly. By suitable selection of the material from which the legs are constructed and the amount of offset of the legs 30 and 32, appropriate flexibility will be imparted to the support legs to provide compensation for the increase in length AC over the length AB during measurement, and the string either does not slide at all at point A or only minimally slides. Consequently, any frictional error which is potentially introduced at the string support locations is greatly reduced without the necessity of using expensive bearing supports or the like.

Another feature of the tensiometer 10 is the relationship between the spring 60 and the plunger 50. The spring is relatively large in diameter and is located outside of the support legs 30 and 32 in contrast to conventional tensiometer devices where the biasing spring is relatively small and a guide-type structure is employed for the corresponding plunger. The large diameter spring 60 is sufficiently stiff in a side-wise direction so that the lower end of the plunger 50 may be held in position solely by the spring without the necessity of a close-fitting sliding support. It will, accordingly, be appreciated that the plunger is displaceable with very little frictional engagement and virtually no guide structure. Consequently, friction induced by the tensiometer itself during the operation has little, if any, effect on the accuracy of tension measurement.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A device for measuring the tension of a string comprising;
    frame means;
    string support means extending from said frame means for engageably supporting a string to be tested at a pair of longitudinally spaced regions thereof, said support means including a pair spaced support legs, said legs having laterally opposed offset foot portions;
    arm means pivotally mounted to said frame means;
    plunger means coupled to said arm means, said plunger means having a free end which is positioned to contact a string to be tested between said support means foot portions;
    spring means mounted to said frame means and engageable against said plunger means to bias said plunger means in a first direction, said spring means comprising a helical coil spring which surrounds said spaced support legs; and
    means defining a scale, said scale defining means being supported from said frame means and being located adjacent to a portion of said arm means, a longitudinally tensioned string engaged by said support means foot portions and contacted by said plunger means being deflected by a force provided by said spring, the angular position of said arm means relative to said scale defining means indicating the tension of the string.

2. The device of claim 1 wherein said foot portions each define a string receiving notch.

3. The device of claim 1 wherein said arm means comprises a distal pointer alignable with selected portions of said scale.

4. The device of claim 3 wherein further comprising means for limiting the angular position of said pointer.

5. The device of claim 1 further comprising pairs of opposed studs projecting from said plunger means and said support means for seating said spring means.

6. The device of claim 1 wherein said frame means further comprises a panel and said scale means comprises a scale affixed to an adhesive tape and mounted to said panel.

7. The device of claim 1 wherein said support legs are sized and shaped to flex under the force of said plunger means against the string being tested.

8. The device of claim 1 wherein said plunger means comprises a plunger having a first end portion pivotally connected to said arm and a wedge-shaped second end portion which engages the string being tested.

9. The device of claim 7 wherein said plunger means comprises a plunger having a first end portion pivotally connected to said arm and a wedge-shaped second end portion which engages the string being tested.

10. The device of claim 9 wherein said frame means defines a slot and said arm means and plunger means are at least partially located in said slot.

11. The device of claim 10 further comprising pairs of opposed studs projecting from said plunger means and said support means for seating said spring means.

12. A device for measuring the tension of a string comprising:
    frame means;
    a pair of spaced string support legs extending from said frame means, said legs each having a string engaging foot portion, said foot portions engaging a longitudinally tensioned string to be tested at a pair of spaced regions thereof, said legs being sized and shaped to flex in response to the application of a generally transverse force to the string at a point intermediate said foot portions;
    arm means pivotally mounted to said frame means;
    plunger means coupled to said arm means, said plunger means having a free end which is positioned to contact the string being tested at said point intermediate said support leg foot portions;
    spring means mounted to said frame means and engageable against said plunger means for biasing said plunger means against the string being tested whereby a known transverse deflection force will be applied to the string; and
    means defining a scale, said scale defining means being supported from said frame means and being located adjacent to a portion of said arm means, the angular position of said arm means relative to said scale defining means when the string is subjected to said deflection force indicating the tension of the string.

13. The device of claim 12 wherein said plunger means comprises a plunger having a first end portion pivotally connected to said arm means and a wedge-shaped second end portion which engages the string being tested.

14. A device for measuring the tension of a string comprising:
    frame means, said frame means defining a slot;
    string support means extending from said frame means for engageably supporting a string to be tested at a pair of longitudinally spaced regions thereof;
    arm means pivotally mounted to said frame means, said arm means being at least in part located in said frame means defined slot;
    plunger means coupled to said arm means, said plunger means having a free end which is positioned to contact a string to be tested between said spaced regions, said plunger means being at least in part located in said frame means defined slot;
    spring means mounted to said frame means and engageable against said plunger means to bias said plunger means in a first direction; and
    means defining a scale, said scale defining means being supported from said frame means and being located adjacent to a portion of said arm means, a longitudinally tensioned string received by said support means and contacted by said plunger means being transversely deflected by a force provided by said spring means, the angular position of said arm means relative to said scale defining means indicating the tension of the string.

15. The device of claim 14 wherein said plunger means comprises a plunger having a first end portion pivotally connected to said arm means and a wedge-shaped second end portion which engages the string being tested.

16. The device of claim 15 wherein said support means includes a pair of spaced support legs, said legs having laterally opposed offset foot portions, said foot portions each defining a string receiving notch.

17. The device of claim 14 wherein said support means includes a pair of spaced support legs, said legs having laterally opposed offset foot portions, said foot portions each define a string receiving notch.

18. The device of claim 17 wherein said support legs are sized and shaped to flex under the force of said plunger means against the string being tested.

19. The device of claim 18 wherein said spring means comprises a helical coil spring surrounding said legs.

* * * * *